United States Patent
Chuang

(10) Patent No.: US 10,252,759 B2
(45) Date of Patent: Apr. 9, 2019

(54) BICYCLE STAND

(71) Applicant: Louis Chuang, Taichung (TW)

(72) Inventor: Louis Chuang, Taichung (TW)

(*) Notice: Subject to any disclaimer, the term of this patent is extended or adjusted under 35 U.S.C. 154(b) by 0 days.

(21) Appl. No.: 15/937,968

(22) Filed: Mar. 28, 2018

(65) Prior Publication Data

US 2018/0370588 A1 Dec. 27, 2018

(30) Foreign Application Priority Data

Jun. 21, 2017 (TW) .............................. 106120727 A

(51) Int. Cl.
| | | |
|---|---|---|
| *F16M 13/00* | (2006.01) | |
| *B62H 3/10* | (2006.01) | |
| *F16M 11/38* | (2006.01) | |
| *F16M 11/04* | (2006.01) | |

(52) U.S. Cl.
CPC ............... *B62H 3/10* (2013.01); *F16M 11/04* (2013.01); *F16M 11/38* (2013.01); *F16M 2200/066* (2013.01); *F16M 2200/08* (2013.01)

(58) Field of Classification Search
CPC .... B60R 9/10; B62H 3/00; B62H 3/10; B62H 3/06; B62H 1/02; B62H 2003/005; B62H 1/00; B62H 1/06
USPC ........... 248/121, 150; 211/20, 21, 22, 23, 24
See application file for complete search history.

(56) References Cited

U.S. PATENT DOCUMENTS

| | | | | |
|---|---|---|---|---|
| 6,047,869 | A | * | 4/2000 | Chiu ........................ B60R 9/06 224/314 |
| 6,158,701 | A | * | 12/2000 | Deshler ............... B05B 13/0285 248/125.1 |
| 6,371,309 | B1 | * | 4/2002 | Smith ...................... B62H 3/12 211/17 |
| 7,568,668 | B2 | * | 8/2009 | Taekema ................. F16C 11/06 248/166 |
| 7,766,798 | B2 | * | 8/2010 | Hamilton ........... A63B 24/0087 434/61 |
| 9,033,160 | B1 | | 5/2015 | Diorio |
| 2009/0256123 | A1 | * | 10/2009 | Heck ........................ B25H 5/00 254/131 |

FOREIGN PATENT DOCUMENTS

| | | |
|---|---|---|
| CN | 203268196 U | 11/2013 |
| DE | 202007012459 U1 | 1/2008 |
| TW | M436617 U | 9/2012 |

* cited by examiner

*Primary Examiner* — Steven M Marsh
(74) *Attorney, Agent, or Firm* — Alan D. Kamrath; Kamrath IP Lawfirm, P.A.

(57) ABSTRACT

A bicycle stand includes a base, a connection unit and a support unit. The base has first and second arms non-parallel to each other. The connection unit is arranged between the first and second arms. The support unit is detachably mounted on the connection unit and is transformable between a folding position and a using position. The support unit is detached from the connection unit when the support unit is in the folding position. The support unit is attached on the connection unit and is adapted to engage with a spindle in a crank-arm of a bicycle to support the bicycle in an upright position on a surface when the support unit is in the using position.

9 Claims, 6 Drawing Sheets

BICYCLE STAND

BACKGROUND OF THE INVENTION

The present invention relates to a stand and, in particular, to a bicycle stand which supports a bicycle in an upright position on a surface.

U.S. Pat. No. 9,033,160 discloses a bicycle stand, which has a base, an upright support structure extending upwardly from the base to a top end, and a spindle engaging post that extends outwardly from the top end of the upright support structure, for engaging a spindle of a bicycle so that the bicycle stand supports the bicycle in an upright position on a surface.

However, the upright support structure is affixed to the base to occupy a relatively large space not conducive to transportation or storage.

Additionally, the base is substantially U-shaped so that the bicycle attached on the upright support structure is easy to fall due to an uneven surface.

Thus, a need exists for a novel bicycle stand to mitigate and/or obviate the above disadvantages.

SUMMARY OF THE INVENTION

A bicycle stand according to the present invention includes a base, a connection unit, a support unit, and a buckle unit. The base has first and second arms non-parallel to each other. The connection unit is arranged between the first and second arms. The support unit is detachably mounted on the connection unit and is transformable between a folding position and a using position. When the support unit is in the folding position, the support unit is detached from the connection unit. When the support unit is in the using position, the support unit is attached on the connection unit and is adapted to engage with a spindle in a crank-arm of a bicycle to support the bicycle in an upright position on a surface.

In an example, the first arm has a first end and a second end opposite to the first end, wherein the second arm has a first end and a second end opposite to the first end. The base further has a first connecting portion and a second connecting portion. The first connecting portion is integrally connected to the first end of the first arm. An included angle formed between the first arm and the first connecting portion is greater than 90 degrees. The second connecting portion is integrally connected to the first end of the second arm. An included angle formed between the second arm and the second connecting portion is greater than 90 degrees. The connection unit includes a first connector detachably mounted between the first and second connecting portions.

In an example, the base further has a third connecting portion and a fourth connecting portion. The third connecting portion is integrally connected to the second end of the first arm and is parallel to the first connecting portion. The fourth connecting portion is integrally connected to the second end of the second arm and is parallel to the second connecting portion. The connection unit further includes a second connector detachably mounted between the third and fourth connecting portions.

In an example, the first and second arms, and the first, second, third, and fourth connecting portions are arranged to form a general trapezoid on the surface.

In an example, the first connector has a connecting post, a supporting leg, and two connecting sections. The connecting post extends along a height direction perpendicular to the surface and detachably connects to the support unit. The supporting leg extends from an outer periphery of the first connector toward the second connector along a width direction perpendicular to the height direction. The two connecting sections respectively extend from two opposite sides of the first connector along a length direction perpendicular to the width direction and respectively detachably connect to the first and second connecting portions.

In an example, the supporting leg has a thickness along the height direction. The thickness of the supporting leg is gradually reduced from the outer periphery of the first connector toward the second connector to form an inclined face. An included angle formed between the inclined face and a bottom face of the supporting leg is less than 90 degrees.

In an example, the connection unit further includes a fastener. The fastener has a threaded portion. The first connector further has a threaded hole disposed through the connecting post. The support unit has an extending section extending along the height direction and a joining section connected to the extending section and extending along the width direction. The extending section detachably connects to the connecting post of the first connector and has a slot arranged to align with the threaded hole. The fastener selectively inserts through the slot of the extending section, and the threaded portion of the fastener is detachably engaged into the threaded hole.

In an example, the fastener further has an abutting portion connected with the threaded portion, and the abutting portion selectively abuts an outer periphery of the extending section.

In an example, the bicycle stand further comprises a buckle unit detachably attached between the base and the support unit. When the support unit is in the folding position, the buckle unit is attached to both of the base and the support unit. When the support unit is in the using position, the buckle unit is attached to one of the base and the support unit.

In an example, the buckle unit includes a first buckle member and a second buckle member. The first buckle member has two first buckle portions disposed at two opposite sides of the first buckle member and adapted to respectively buckle with the third connecting portion and the support unit. The second buckle member has two second buckle portions disposed at two opposite sides of the second buckle member and adapted to respectively buckle with the second arm and the support unit.

DETAILED DESCRIPTION OF THE INVENTION

Figure 1:
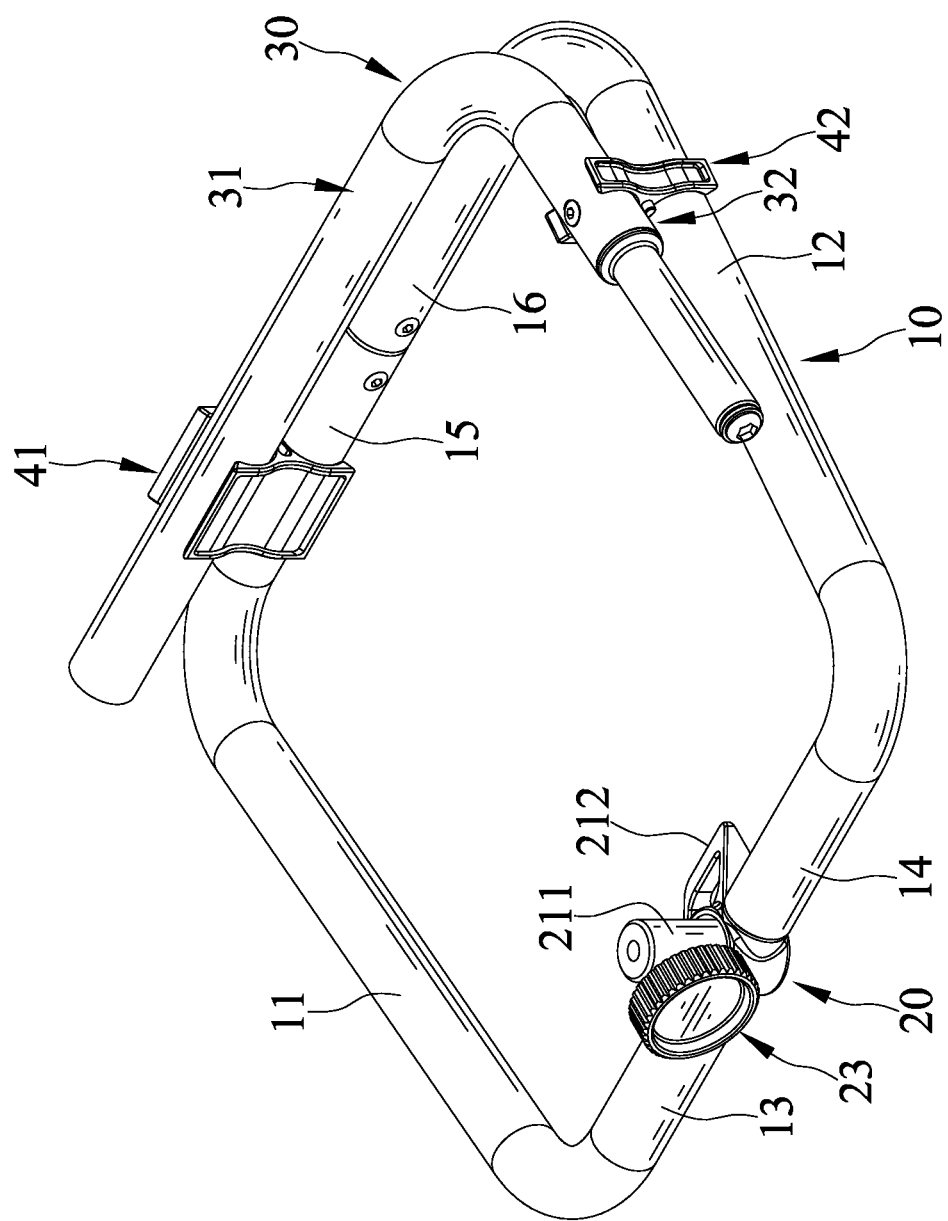
FIG. 1 is a perspective view of a bicycle stand according to the present invention and illustrates the bicycle stand in a folding position.
Figure 2:
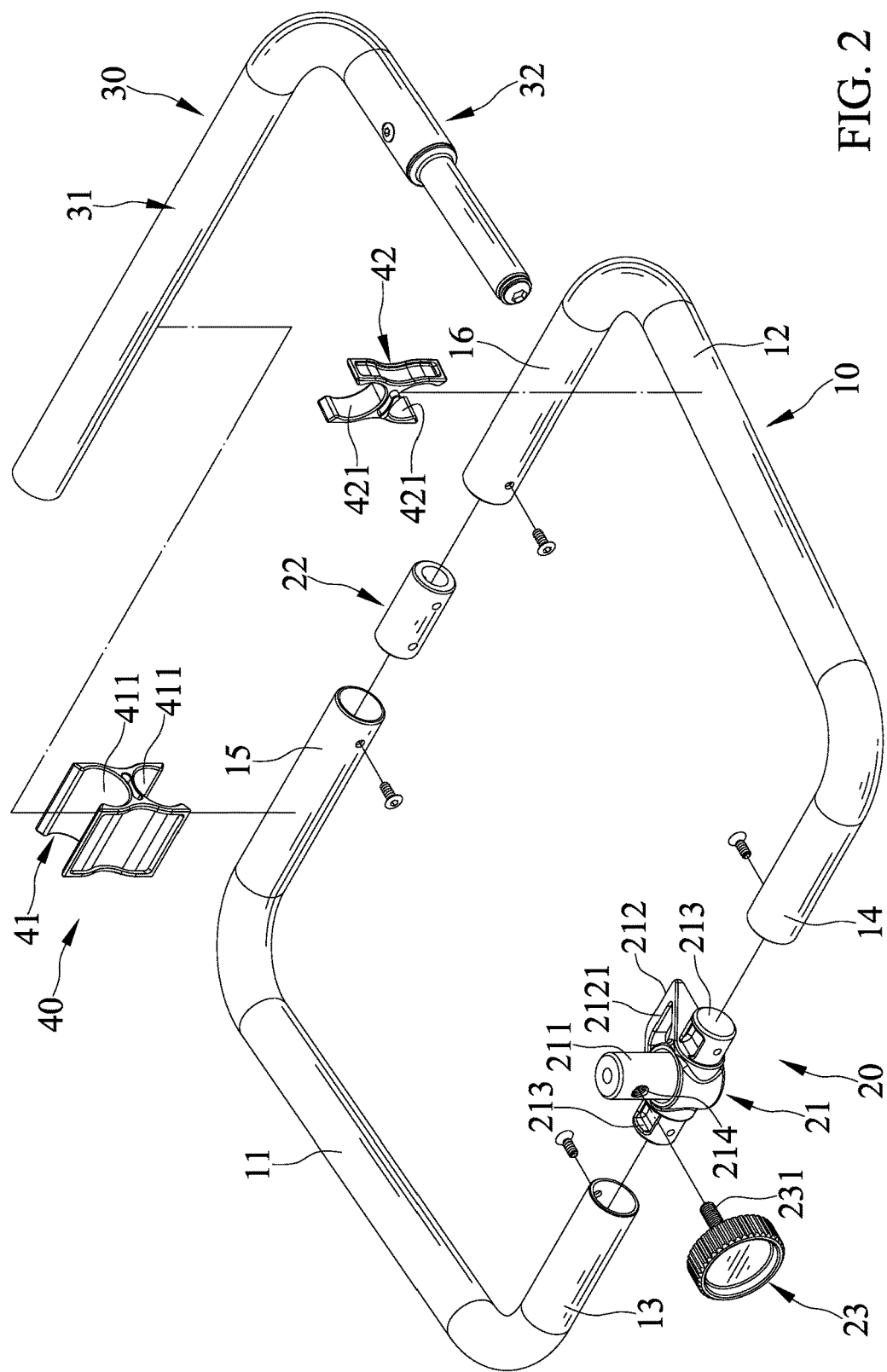
FIG. 2 is an exploded, perspective view of the bicycle stand of FIG. 1.
Figure 3:
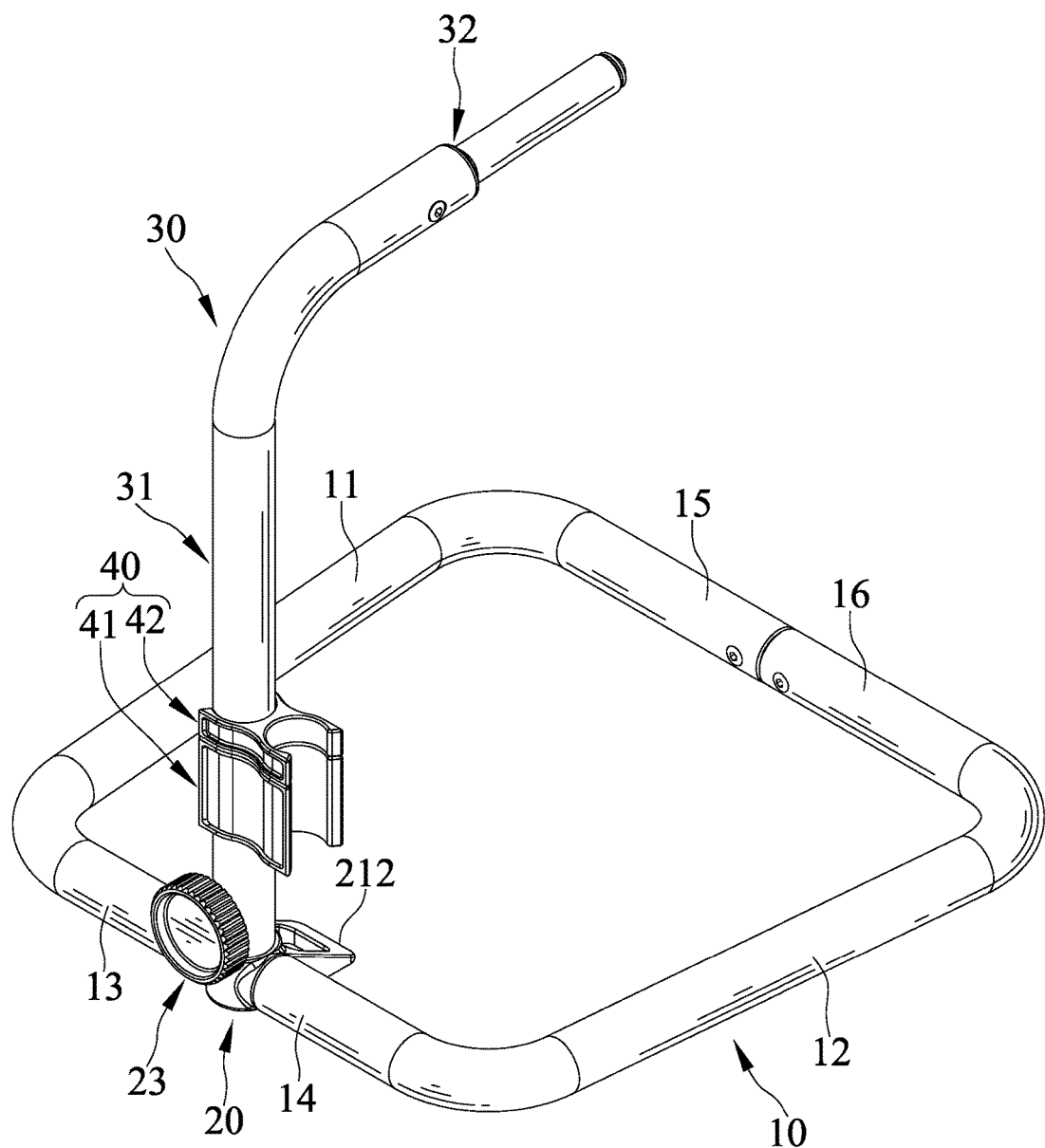
FIG. 3 is another perspective view of the bicycle stand according to the present invention and illustrates the bicycle stand in a using position.
Figure 4:
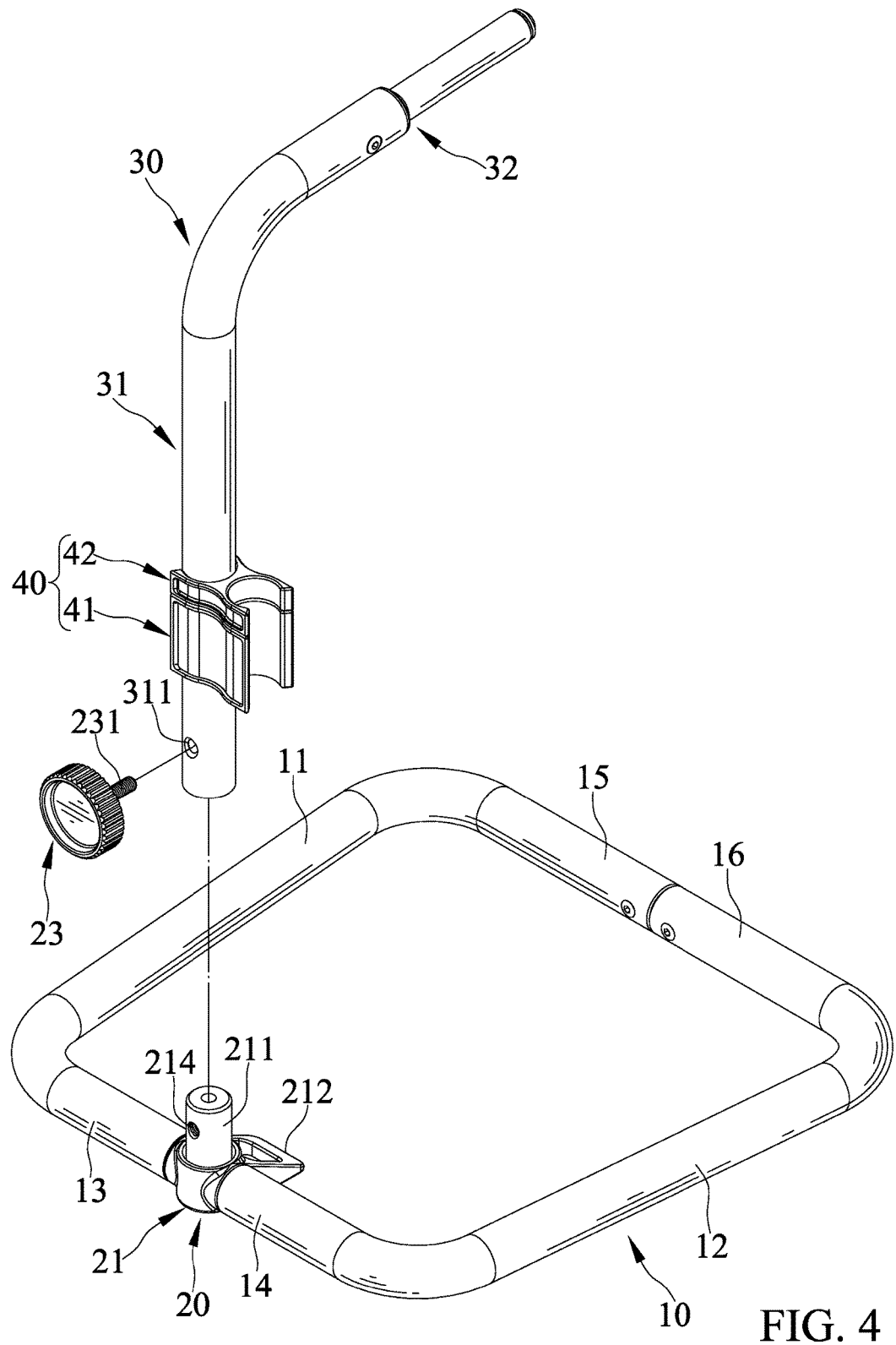
FIG. 4 is an exploded, perspective view of the bicycle stand of FIG. 3.
Figure 5:
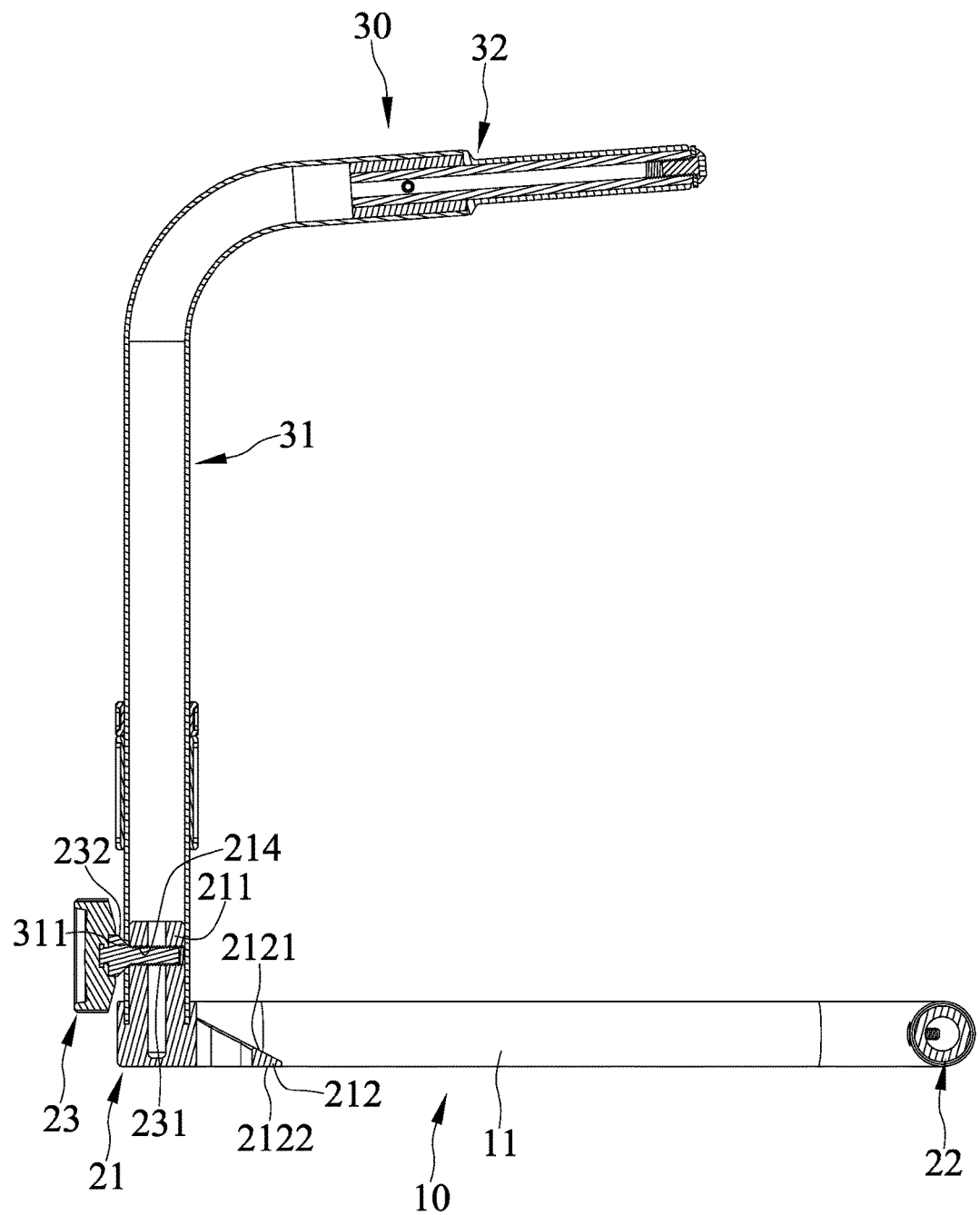
FIG. 5 is a cross-sectional view of the bicycle stand of FIG. 3.
Figure 6:
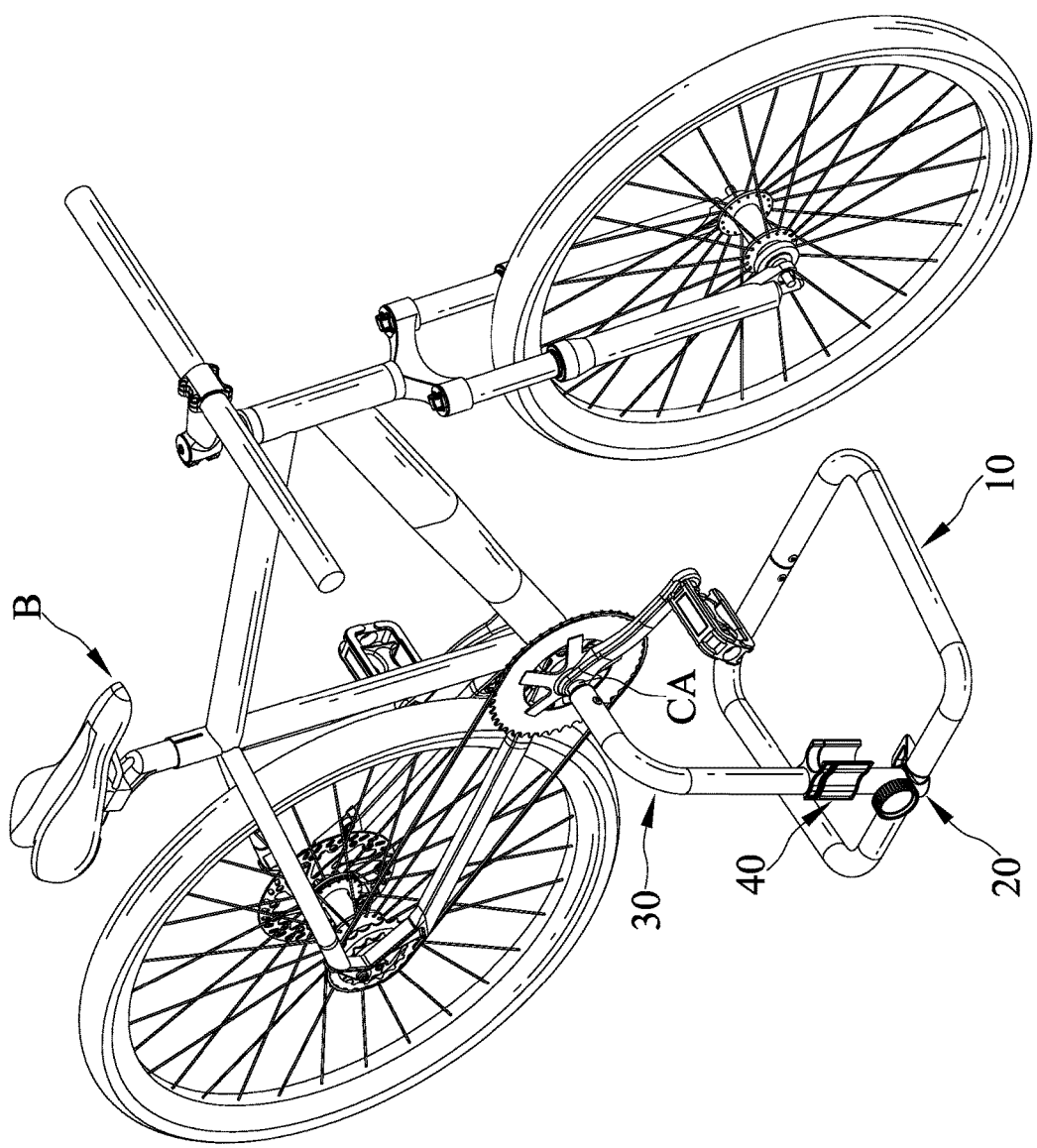
FIG. 6 is a perspective view of the bicycle stand of FIG. 3 and illustrates the bicycle stand engaging with a spindle in a crank-arm of a bicycle.

FIGS. 1-6 show a bicycle stand according to the present invention. The bicycle stand includes a base 10, a connection unit 20 attached to base 10, a support unit 30 detachably mounted on connection unit 20, and a buckle unit 40 detachably attached between base 10 and support unit 30. Support unit 30 is transformable between a folding position (FIG. 1) and a using position (FIG. 3). When support unit 30 is in the folding position, support unit 30 is detached from connection unit 20, and is attached to base 10 via buckle unit 40. When support unit 30 is in the using position, support unit 30 is attached on connection unit 20 and is adapted to engage with a spindle in a crank-arm CA of a bicycle B to support bicycle B in an upright position on a surface.

Base 10 has first and second arms 11 and 12, and first, second, third, and fourth connecting portions 13, 14, 15, and 16. First and second arms 11 and 12 are non-parallel to each other, namely, extending directions of first and second arms 11 and 12 are non-parallel to each other. First arm 11 has a first end and a second end opposite to the first end. First connecting portion 13 is integrally connected to the first end of first arm 11, and third connecting portion 15 is integrally connected to the second end of first arm 11, so first arm 11, first connecting portion 13, and third connecting portion 15 together form a generally U-shaped structure. Second arm 12 has a first end and a second end opposite to the first end. Second connecting portion 14 is integrally connected to the first end of second arm 12, and fourth connecting portion 16 is integrally connected to the second end of second arm 12, so second arm 12, second connecting portion 14, and fourth connecting portion 16 together form a generally U-shaped structure.

Additionally, an included angle formed between first arm 11 and first connecting portion 13 is greater than 90 degrees. Third connecting portion 15 is parallel to first connecting portion 13. An included angle formed between second arm 12 and second connecting portion 14 is greater than 90 degrees. Fourth connecting portion 16 is parallel to second connecting portion 14. Thus, first and second arms 11 and 12 and first, second, third, and fourth connecting portions 13, 14, 15, and 16 are arranged to form a general trapezoid on the surface. First and second connecting portions 13 and 14 together form the short base of the trapezoid. Third and fourth connecting portions 15 and 16 together form the long base of the trapezoid. First and second arms 11 and 12 form slant sides of the trapezoid. Thus, the trapezoid structure of base 10 prevents bicycle B from falling due to an uneven surface when support unit 30 engages with the spindle in crank-arm CA of bicycle B.

Connection unit 20 is arranged between first and second arms 11 and 12 and includes a first connector 21 detachably mounted between first and second connecting portions 13 and 14, a second connector 22 detachably mounted between third and fourth connecting portions 15 and 16, and a fastener 23 movably inserted into first connector 21. Moreover, first and second connectors 21 and 22 can be threadedly mounted between first and second connecting portions 13 and 14 and third and fourth connecting portions 15 and 16, respectively. First connector 21 has a connecting post 211, a supporting leg 212, two connecting sections 213, and a threaded hole 214. Connecting post 211 extends along a height direction perpendicular to the surface and detachably connects to support unit 30. Supporting leg 212 extends from an outer periphery of first connector 21 toward second connector 22 along a width direction perpendicular to the height direction. Supporting leg 212 has a thickness along the height direction. The thickness of supporting leg 212 is gradually reduced from the outer periphery of first connector 21 toward second connector 22 to form an inclined face 2121. An included angle formed between inclined face 2121 and a bottom face 2122 of supporting leg 212 is less than 90 degrees. Two connecting sections 213 respectively extend from two opposite sides of first connector 21 along a length direction perpendicular to the width direction and respectively detachably connect to first and second connecting portions 13 and 14. Moreover, two connecting sections 213 can be threadedly connected to first and second connected portions 13 and 14. Threaded hole 214 is disposed through connecting post 211. Fastener 23 has a threaded portion 231 and an abutting portion 232 connected with threaded portion 231. Threaded portion 231 is detachably engaged into threaded hole 214 of first connector 21, and abutting portion 232 selectively abuts an outer periphery of support unit 30.

Support unit 30 has an extending section 31 extending along the height direction and a joining section 32 connected to extending section 31 and extending along the width direction. Extending section 31 detachably connects to connecting post 211 of first connector 21 and has a slot 311 configured to align with threaded hole 214 of first connector 21. Thus, fastener 23 can insert through slot 311 when slot 311 aligns with threaded hole 214 to cause threaded portion 231 to be engaged into threaded hole 214 and to abut a portion 232 abutting the outer periphery of extending section 31.

Buckle unit 40 includes a first buckle member 41 and a second buckle member 42. First buckle member 41 has two first buckle portions 411 disposed at two opposite sides of first buckle member 41 and adapted to respectively buckle with third connecting portion 15 of base 10 and extending section 31 or joining section 32 of support unit 30. Second buckle member 42 has two second buckle portions 421 disposed on two opposite sides of second buckle member 42 and adapted to respectively buckle with second arm 12 of base 10 and extending section 31 or joining section 32 of support unit 30. Thus, buckle unit 40 prevents support unit 30 from being easily detached from base 10, when support unit 30 is in the folding position.

When support unit 30 is in the folding position (FIG. 1), threaded portion 231 of fastener 23 is disengaged from threaded hole 214 of first connector 21, and abutting portion 232 is detached from the outer periphery of extending section 31, so extending section 31 can detach from connecting post 211 of first connector 21. Buckle unit 40 is attached to both base 10 and support unit 30. Hence, base 10 and support unit 30 can be stacked with each other whereby the bicycle stand can be collapsed into a compact volume. Moreover, a plurality of bicycle stands in the folding position can also be stacked with each other to reduce the deposit space.

When support unit 30 is in the using position (FIGS. 3 and 6), buckle unit 40 is attached to one of base 10 and support unit 30. Extending section 31 connects to connecting post 211 of first connector 21. Slot 311 aligns with threaded hole 214 of first connector 21. Fastener 23 inserts through slot 311, so threaded portion 231 is engaged into threaded hole 214, and abutting portion 232 abuts the outer periphery of extending section 31. Thus, support unit 30 is secured on the connecting post 211 and is adapted to engage with the spindle in crank-arm CA of bicycle B to support bicycle B in the upright position on the surface. Additionally, supporting leg 212 extending from the outer periphery of first connector 21 toward second connector 22 prevents bicycle B from falling due to the uneven surface.

While various embodiments have been described above, it should be understood that they have been presented by way of example only, and not limitation. For example, any of the elements associated with the summary may employ any of the desired functionality set forth hereinabove. Thus, the breadth and scope of preferred embodiments should not be limited by any of the above-described exemplary embodiments.

What is claimed is:

1. A bicycle stand comprising:
a base having first and second arms non-parallel to each other, wherein the first arm has a first end and a second end opposite to the first end, wherein the second arm has a first end and a second end opposite to the first end, wherein the base further has a first connecting portion and a second connecting portion, wherein the first connecting portion is integrally connected to the first end of the first arm, wherein an included angle formed between the first arm and the first connecting portion is greater than 90 degrees, wherein the second connecting portion is integrally connected to the first end of the second arm, wherein an included angle formed between the second arm and the second connecting portion is greater than 90 degrees;
a connection unit arranged between the first and second arms, wherein the connection unit includes a first connector detachably mounted between the first and second connecting portions; and
a support unit detachably mounted on the connection unit and transformable between a folding position and a using position;
wherein when the support unit is in the folding position, the support unit is detached from the connection unit; and
wherein when the support unit is in the using position, the support unit is attached on the connection unit and is adapted to engage with a spindle in a crank-arm of a bicycle to support the bicycle in an upright position on a surface.

2. The bicycle stand as claimed in claim 1, wherein the base further has a third connecting portion and a fourth connecting portion, wherein the third connecting portion is integrally connected to the second end of the first arm and is parallel to the first connecting portion, wherein the fourth connecting portion is integrally connected to the second end of the second arm and is parallel to the second connecting portion, and wherein the connection unit further includes a second connector detachably mounted between the third and fourth connecting portions.

3. The bicycle stand as claimed in claim 2, wherein the first and second arms and the first, second, third, and fourth connecting portions are arranged to form a general trapezoid on the surface.

4. The bicycle stand as claimed in claim 2, wherein the first connector has a connecting post, a supporting leg, and two connecting sections, wherein the connecting post extends along a height direction perpendicular to the surface and detachably connects to the support unit, wherein the supporting leg extends from an outer periphery of the first connector toward the second connector along a width direction perpendicular to the height direction, and wherein the two connecting sections respectively extend from two opposite sides of the first connector along a length direction perpendicular to the width direction and respectively detachably connect to the first and second connecting portions.

5. The bicycle stand as claimed in claim 4, wherein the supporting leg has a thickness along the height direction, wherein the thickness of the supporting leg is gradually reduced from the outer periphery of the first connector toward the second connector to form an inclined face, and wherein an included angle formed between the inclined face and a bottom face of the supporting leg is less than 90 degrees.

6. The bicycle stand as claimed in claim 4, wherein the connection unit further includes a fastener, wherein the fastener has a threaded portion, wherein the first connector further has a threaded hole disposed through the connecting post, wherein the support unit has an extending section extending along the height direction and a joining section connected to the extending section and extending along the width direction, wherein the extending section detachably connects to the connecting post of the first connector and has a slot configured to align with the threaded hole, wherein the fastener selectively inserts through the slot of the extending section, and wherein the threaded portion of the fastener is detachably engaged into the threaded hole.

7. The bicycle stand as claimed in claim 6, wherein the fastener further has an abutting portion connected with the threaded portion, and wherein the abutting portion selectively abuts an outer periphery of the extending section.

8. The bicycle stand as claimed in claim 6, further comprising:
a buckle unit detachably attached between the base and the support unit;
wherein when the support unit is in the folding position, the buckle unit is attached to both of the base and the support unit;
wherein when the support unit is in the using position, the buckle unit is attached to one of the base and the support unit.

9. The bicycle stand as claimed in claim 8, wherein the buckle unit includes a first buckle member and a second buckle member, wherein the first buckle member has two first buckle portions disposed at two opposite sides of the first buckle member and adapted to respectively buckle with the third connecting portion and the support unit, and wherein the second buckle member has two second buckle portions disposed at two opposite sides of the second buckle member and adapted to respectively buckle with the second arm and the support unit.

* * * * *